(12) United States Patent
Habens

(10) Patent No.: US 10,551,277 B2
(45) Date of Patent: Feb. 4, 2020

(54) ENGINE PERFORMANCE MONITORING USING STRAIN SENSOR ATTACHED TO DRIVE SHAFT

(71) Applicant: DATUM ELECTRONICS LIMITED, East Cowes, Isle of Wight (GB)

(72) Inventor: Malcolm John Habens, Ryde (GB)

(73) Assignee: DATUM ELECTRONICS LIMITED, Isle of Wight (GB)

( * ) Notice: Subject to any disclaimer, the term of this patent is extended or adjusted under 35 U.S.C. 154(b) by 66 days.

(21) Appl. No.: 15/546,566

(22) PCT Filed: Jan. 27, 2016

(86) PCT No.: PCT/GB2016/050174
§ 371 (c)(1),
(2) Date: Jul. 26, 2017

(87) PCT Pub. No.: WO2016/120616
PCT Pub. Date: Aug. 4, 2016

(65) Prior Publication Data
US 2017/0370805 A1    Dec. 28, 2017

(30) Foreign Application Priority Data

Jan. 27, 2015 (GB) .................................. 1501304.8

(51) Int. Cl.
| | | |
|---|---|---|
| *G01M 15/04* | (2006.01) |
| *G01M 15/12* | (2006.01) |
| *G01L 3/10* | (2006.01) |
| *G01L 3/24* | (2006.01) |

(52) U.S. Cl.
CPC .............. *G01M 15/12* (2013.01); *G01L 3/108* (2013.01); *G01L 3/242* (2013.01)

(58) Field of Classification Search
USPC ............... 73/114.13, 114.14, 114.15, 114.24, 73/114.25, 115.05
See application file for complete search history.

(56) References Cited

FOREIGN PATENT DOCUMENTS

| EP | 0892262 A2 | 1/1999 |
| WO | 03/001175 A1 | 1/2003 |
| WO | 2016/120616 A1 | 8/2016 |

OTHER PUBLICATIONS

"International Search Report" and "Written Opinion" of the International Search Authority (ISA/EPO) in Datum Electronics Limited, International Patent Application Serial No. PCT/GB2016/050174, dated May 12, 2016 (9 pages).

Merkisz, Jerzy; Bogus, Piotr; Grzeszczyk, Rafal. "Overview of Engine Misfire Detection Methods Used in on Board Diagnostics," Journal of Kones. Combustion Engines, Jan. 1, 2001, pp. 326-341, vol. 8, No. 1-2 (15 pages).

*Primary Examiner* — Eric S. McCall
(74) *Attorney, Agent, or Firm* — Tillman Wright, PLLC; James D. Wright; David R. Higgins

(57) ABSTRACT

Apparatus and method for monitoring operational performance of an engine, the apparatus comprising a sensor (10) for detecting torsional strain of a shaft (21) of an engine, and the apparatus further comprising a data processor arranged to process signals received from the strain sensor, and the data processor further arranged to compare one or more operational characteristics of the measured torsional strain data with idealised operational data so as to provide a measure of operational performance indicator of the engine.

24 Claims, 6 Drawing Sheets

ENGINE PERFORMANCE MONITORING USING STRAIN SENSOR ATTACHED TO DRIVE SHAFT

CROSS REFERENCE TO RELATED APPLICATIONS

This application is the U.S. national stage application under 35 U.S.C. § 371 of co-pending International Application No. PCT/GB2016/050174, filed Jan. 27, 2016 and designating the U.S., which published as WO 2016/120616 A1 on Aug. 4, 2016, and which claims the benefit of United Kingdom Patent Application No. GB 1501304.8, filed Jan. 27, 2015. Each of the foregoing patent applications and patent application publications is expressly incorporated by reference herein in its entirety.

TECHNICAL FIELD

The present invention relates generally to engine performance monitoring.

BACKGROUND

In the field of marine engines, it is known to monitor the performance of such engines by using a temperature sensor and a pressure transducer. However, pressure transducers are subject to experiencing dynamic loads which limit their working lives. Moreover, a pressure transducer and a temperature sensor need to be provided for each cylinder of the engine, and so for a twelve cylinder engine, twelve channels of instrumentation need to be provided (with two or more sensors to each). Such known methods use analysis of the Otto engine cycle.

We have devised an improved way of monitoring engine performance, and in particular, although not exclusively, marine engine performance.

SUMMARY

According to a first aspect of the invention there is provided a method of analysing operational performance of an engine comprising use of at least one strain sensor attached to a drive shaft of the engine, the method comprising recording dynamic torsional strain data of the drive shaft during operational rotation of the shaft, and using the measured strain data to compare one or more operational characteristics of the engine with pre-determined idealised operational data, and deducing from the comparison at least one measure for use in determining an operational performance indicator of the engine.

According to a second aspect of the invention there is provided apparatus for monitoring operational performance of an engine, the apparatus comprising a sensor for detecting torsional strain of a shaft of an engine, and the apparatus further comprising a data processor arranged to process signals received from the strain sensor, and the data processor further arranged to compare one or more operational characteristics of the measured torsional strain data with idealised operational data so as to provide a measure of operational performance indicator of the engine.

The method or the apparatus of the above aspects of the invention may include one of more features disclosed in either of the description and/or the drawings.

BRIEF DESCRIPTION OF THE DRAWINGS

Various embodiments of the invention will now be described, by way of example only, with reference to the following drawings in which.

DETAILED DESCRIPTION

There is now described apparatus, and associated methodology, for monitoring the operational performance of engines, and in particular, although not exclusively, marine diesel engines. As will be described in detail below, the apparatus advantageously allows the operational performance of an engine to be monitored to provide an indication to allow pre-emptive measures to be taken to ensure optimum use and operation of the engine. The apparatus is particularly, although not exclusively, of benefit in use for monitoring the performance of engines operating between 400 rpm and 600 rpm.

In summary, by analysing the shaft strain profile data in the time domain over the full engine cycle (normally 720 degrees) it can be determined whether the engine is running with a substantially ideal and symmetrical drive cycle or if it varying from this cycle, it is possible to identify which cylinders are running out of their target or ideal range and by comparison with the engine model it is possible to identify a potential loss of efficiency. In the frequency domain it is possible to identify frequencies outside of the idealised model range indicative of potential damage and the state of the tuning balance between maximum power and engine life can be identified. Idealised model data is used as a reference data. A perfectly configured engine should match the idealised model; however in practice this is not achievable. But by making such a comparison it is possible to deduce how efficient/effective the current engine configuration is, which cylinders are out of tune and which additional dominant frequencies are present indicative of possible failure modes.

Figure 1A:
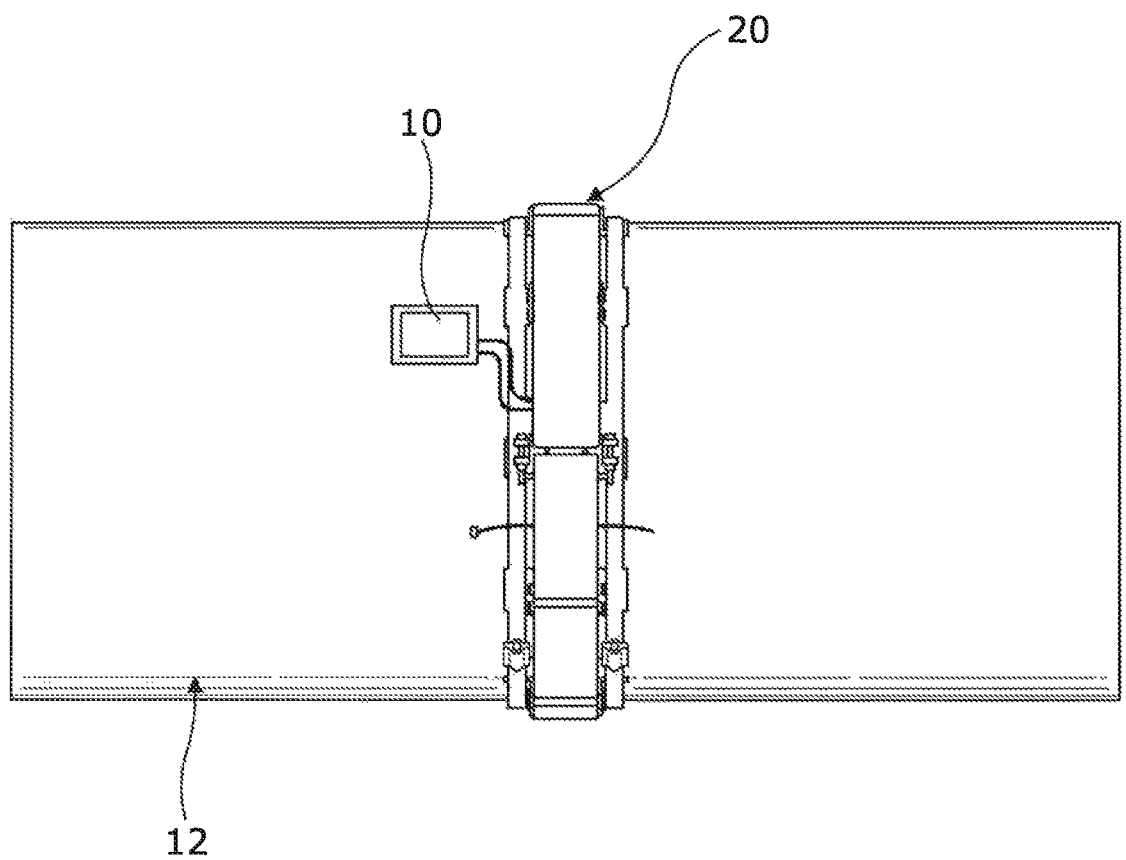
FIG. 1a is a plan view of an engine shaft to which is provided a strain sensor and a tachometer.
Figure 1B:
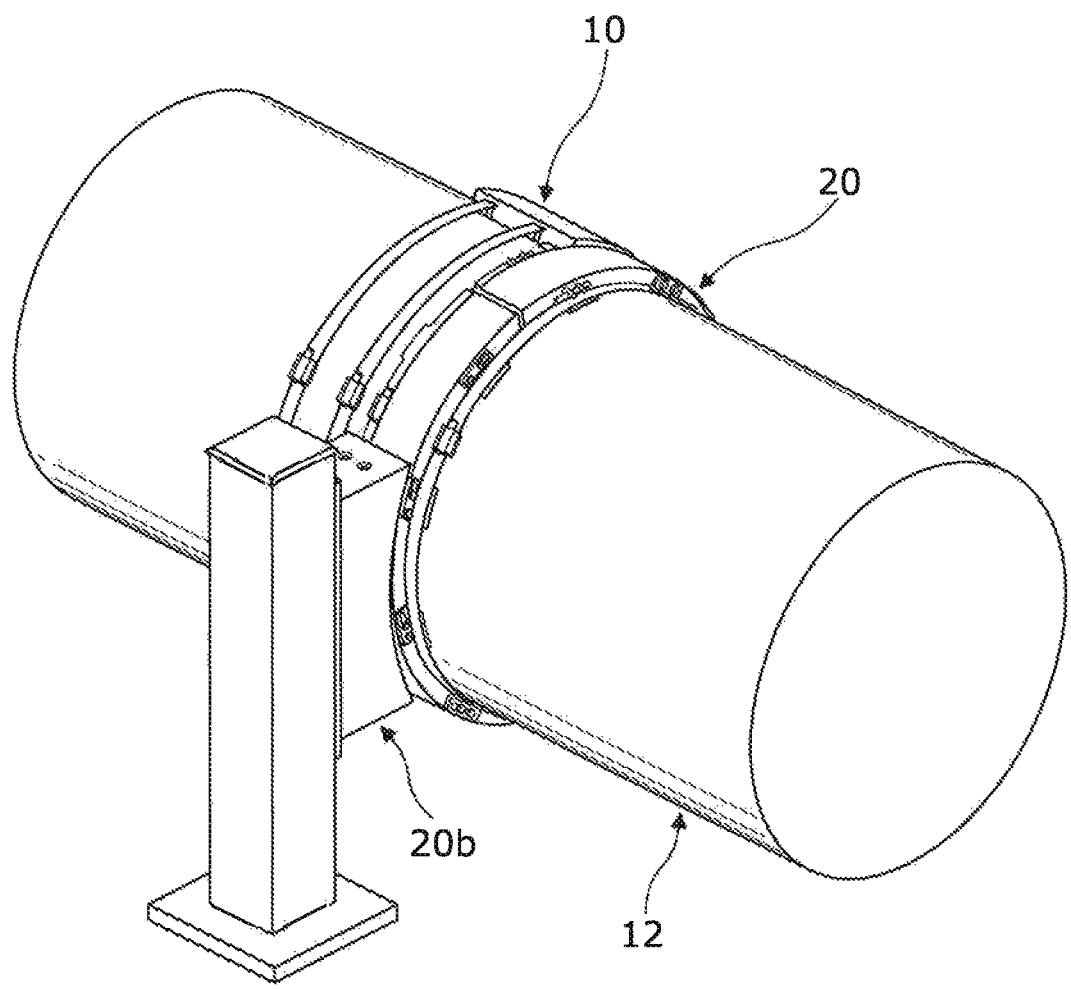
FIG. 1b is a perspective view of the engine shaft of FIG. 1a, FIG. 2 is a plot of variation in measured torsional strain against time, of a rotating engine shaft.

Turning to FIGS. 1a and 1b, and the detail of the apparatus, it comprises a torque transducer 10, or torsion meter, or torque sensor/gauge, which is connected to the shaft 12 being monitored, to provide an accurate and dynamic measure of (the substantially) instantaneous torque to which the shaft is subjected. The torque sensor comprises a full-bridge strain gauge (of known type) and is fixedly attached to the shaft such that variations in strain experienced by the shaft at the locations of the gauges are sensed thereby. The rate of strain measurement data transmitted is advantageously between 100 and 4000 Hz, thus providing a substantially continuous stream of torsional strain data.

The gauge is preferably located on the shaft as close as possible to the drive loads, so as to maximise the effectiveness of the measurements made by the gauge.

The apparatus further comprises conditioning electronics, a transmitter and a power coupling on shaft and a signal processing system off-shaft. The signals transmitted are indicative of a measure of strain at one point or region of the circumference of the shaft.

If additional sensing points are required, two such gauges can be attached to the shaft, at ninety degrees to each other, relative to the circumference of the shaft.

The apparatus further comprises a tachometer 20 arranged to sense the angular reference points of the shaft and the speed of rotation of the shaft. The tachometer comprises a ferromagnetic ring structure which is arranged around the shaft. The presence/absence of the ferromagnetic material around the extent of the ring structure provides one or more detectable reference points. A Hall probe detector 20b is positioned adjacent to the ring structure, which, when the shaft is rotated, produces a pulsed signal. This signal is used to synchronise the measured torque strain data with the rotation of the shaft. It will be appreciated that the tachometer may alternatively comprise either an inductive or reflective sensor.

The off-shaft data processor monitors and logs the dynamic shaft torque and its angular reference point(s). A memory of, or associated with, the processor stores the model signature of the engine and the first actual reference signature of the engine. By comparing the measured data with the reference signatures, the processor is able to determine and report on events and changes to the engine. It will be appreciated that in different embodiments at least some or all of the data processing and data storage may be performed by componentry on-shaft.

In use, when the engine is running, the shaft rotates, and the data processor receives rotational reference and speed data and dynamic torsional strain data. These data could then be computationally analysed by way of a Fast Fourier Transform (FFT) or wavelet analysis, for example.

Figure 2:
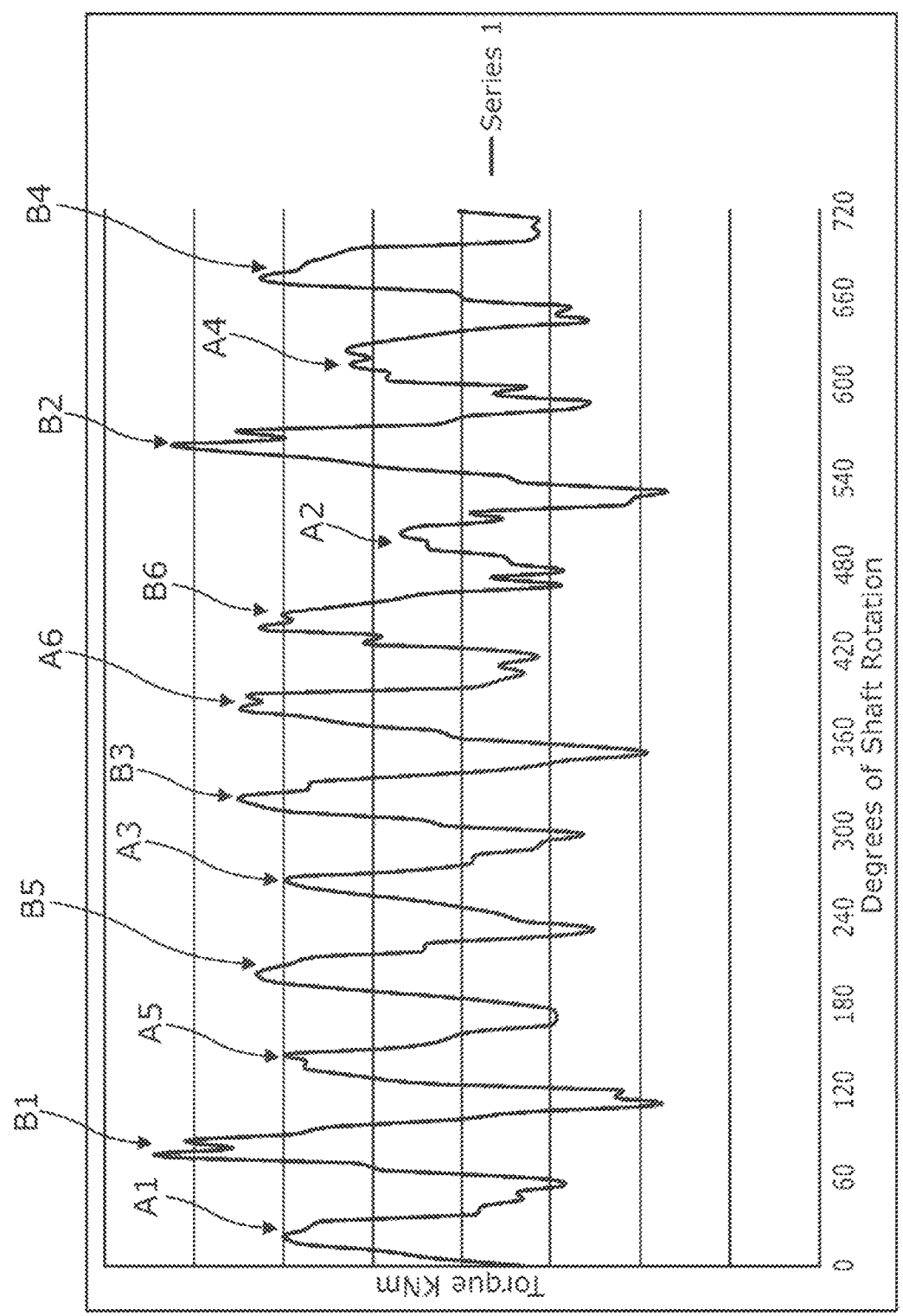

FIG. 2 shows a plot of sensed strain versus time. As can be seen, the plot comprises a series of peaks, each of which relates to a cylinder of a twelve cylinder engine, denoted as A1, A2, A3, A4, A5, A6, and B1, B2, B3, B4, B5 and B6. The plot provides a torque profile of the engine, which is particular to that particular engine, and to its particular operating conditions and tuning condition at that time. This torque profile data allows the following parameters to be determined:

1. The change in engine cylinder torque profile gives a direct indication of changes to the overall efficiency of the engine, when compared to idealised model data,
2. The change in engine cylinder torque profile identifies particular cylinders that are at variance with the idealised model data, and
3. The cylinder torque profile shows a particular trend of change (as compared to the idealised model data) between service periods.

When the engine is operated over a number of cycles, the data processor is able to collect strain data for each engine cycle, and calculate statistical values, which could be graphically represented in a box and whisker diagram for each of the peaks. These values may include maximum torque, minimum torque and average torque for each peak.

Figure 3:
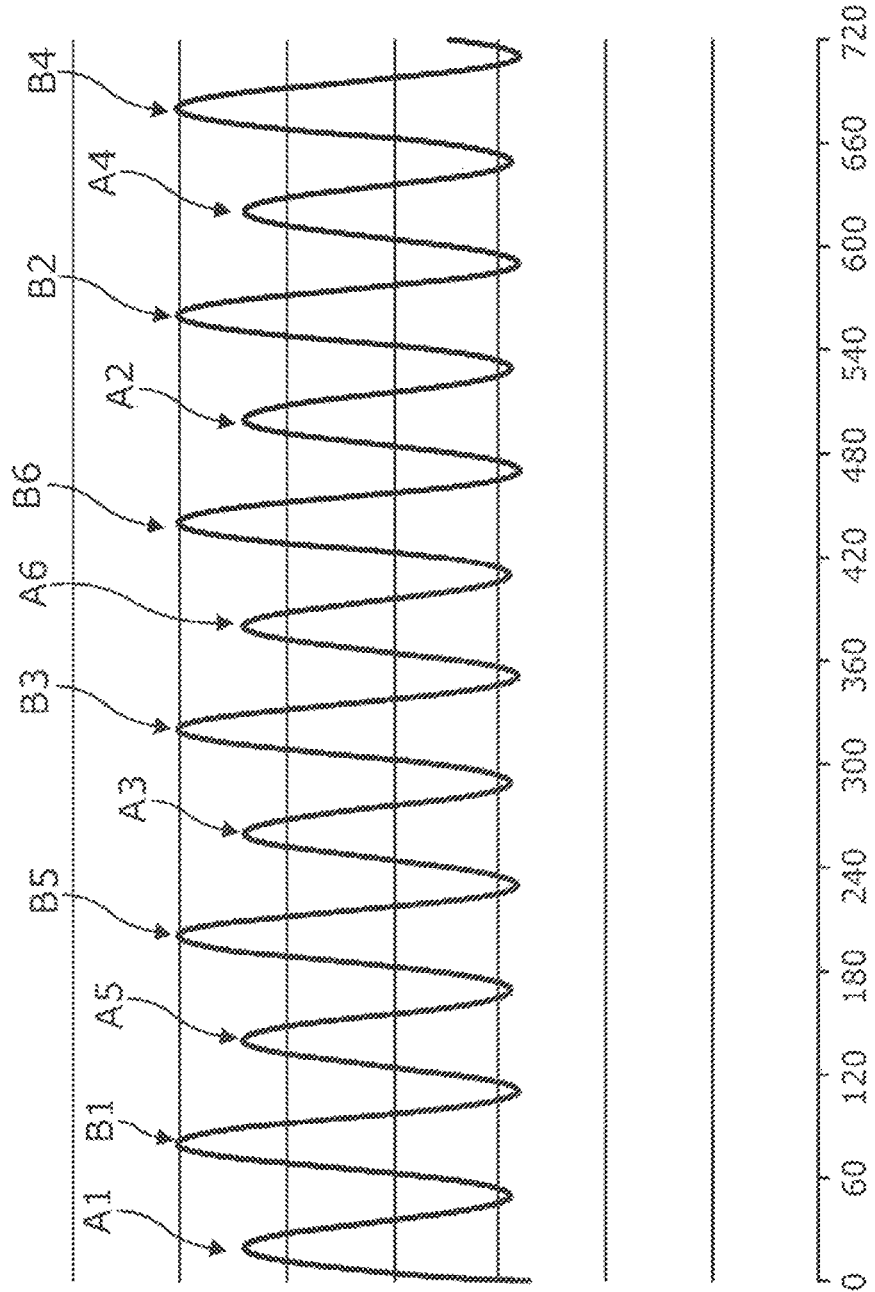
FIG. 3 is a plot of torsional strain of idealised model data.

FIG. 3 shows a simplified representation of an idealised torsional strain plot of a twelve cylinder engine. As can be seen, even with all cylinders running at an even pressure the idealised trace is characteristically arrhythmic due to the firing intervals of a V-configuration engine. It is from such idealised data that characteristic data and parameters, such as amplitude, amplitude range, frequency, can be deduced so as to form reference data for comparison with the measured data.

Figure 4:
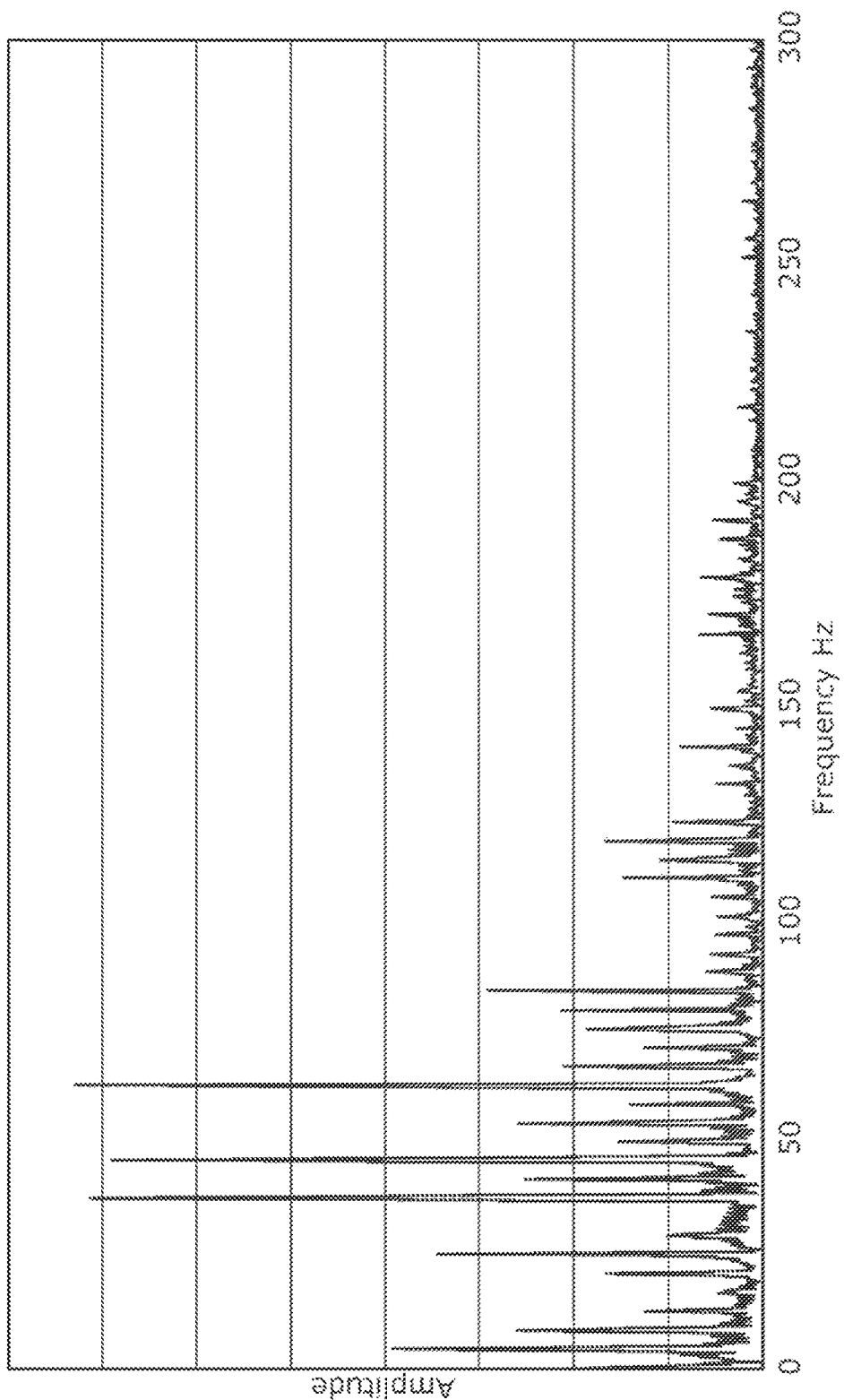
FIG. 4 is a plot in the frequency domain of measured dynamic torsional strain data.

In addition to analysing measured strain data, the data processor is also configured to analyse the dominant frequencies present over each of the strain variation cycles of the shaft. This data can then be represented by way of a frequency plot. The data processor implements suitable data analysis procedures to determine the frequency spectrum of the measured strain variation. An example of a frequency contour plot is provided in FIG. 4 in which the predominance of different frequencies of the various measured samples is displayed. Such analysis of the frequency data, in comparison to the frequencies expected for the idealised data, enables various operational performance indicators to be determined, such as:

1. Frequency data is seen on the data which shows deficiencies in engine tuning
2. Changes to frequency profile are indicative of engine degradation.

For example, an off-frequency peak or an additional frequency (as compared to idealised data) may be indicative of something which necessitates further investigation.

The data processor is advantageously configured to store the idealised model data and perform the analysis. The data processor may further be configured to store threshold metrics which, if once the analysis has been conducted are reached, the data processor is arranged to issue an output or a signal to allow the appropriate action to be taken. For example, an alert signal could be output if a threshold metric is determined to have been reached indicative of a maintenance or service operation urgently needing to be taken. This could be by way of the signal being sent from a transmitter of the data processor over a communications' network.

The data processor is further configured to determine instantaneous power by the data processor using the following equation:

$$\text{Power (Watts)} = \text{Torque (Nm)} \times \text{Speed (RPM)} \times \text{PI}/30$$

This can then be used to provide a measure of the average power delivered (to the propeller or generator in relation to a marine engine application). This can then be used to provide a measure of fuel efficiency. Indeed, the fuel efficiency can be monitored over time.

The system is unique in being able to provide both instantaneous and aggregate power alongside the engine condition data.

Figure 5:
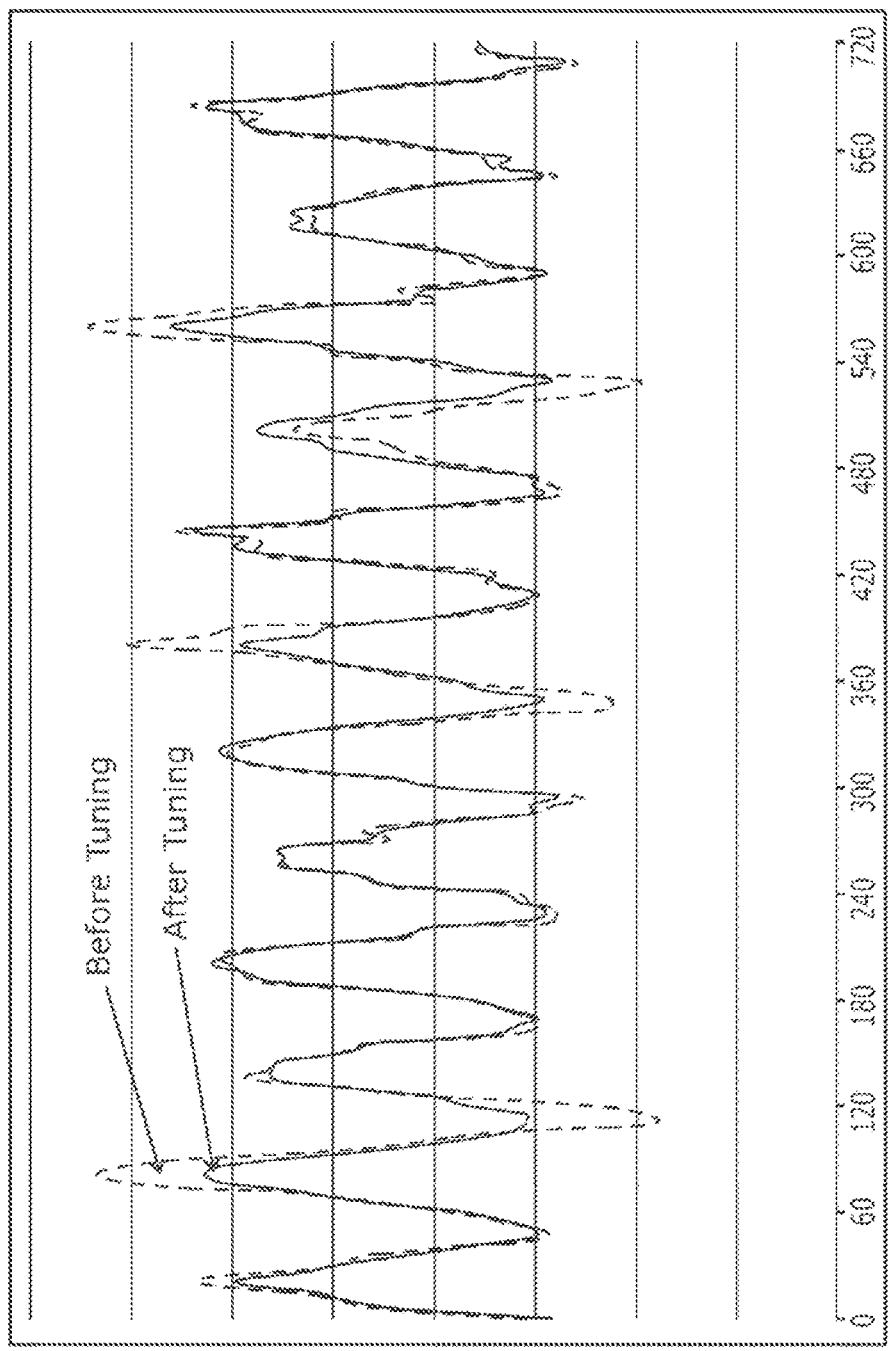
FIG. 5 shows two plots of dynamic torsional strain one before tuning, and one after an engine tuning procedure.

Reference is made to FIG. 5 which shows two dynamic strain plots, one before tuning, shown in broken line, and one after tuning, shown in solid line. Analysis of the initial plot indicates that the variance between the plot and the idealised data was such that tuning was required in order to improve the operational performance of the engine. The tuning procedure is successful in better aligning the dynamic strain profile to the idealised model data. After a first tuning procedure, the measured dynamic strain data as a result of the tuning may be analysed, and so indicating the extent and manner in which a possible further tuning step is be effected.

In a modified embodiment, there may be provided a torsional accelerometer, arranged to sense vibration during rotation of the shaft. The accelerometer would be attached to the shaft. Data collected from the accelerometer can be used in addition to data collected from the strain gauge, to provide an indication of imbalanced engine cycles and torsional vibration of the shaft. Torsional vibration is an angular vibration or oscillation of the shaft, which may propagate axially along a rotating shaft.

A key advantage of the engine performance monitoring method and system described above is that they enable pre-emptive action to be taken, either to improve the running efficiency, or to avoid the damage undergoing serious damage. Timely review, or notification, of the data generated, enables the appropriate remedial action to be taken. As alluded to above, this may involve engine parts being serviced or replaced, or tuning of the engine itself, or even engine replacement.

The invention claimed is:

1. A method of analysing operational performance of an engine comprising use of at least one strain sensor attached to a drive shaft of the engine, the method comprising:
   recording dynamic torsional strain data of the drive shaft during operational rotation of the shaft,
   using the recorded strain data to compare one or more operational characteristics of the engine with pre-determined idealised operational data,
   deducing from the comparison at least one measure for use in determining an operational performance indicator of the engine, and
   analysing the recorded dynamic torsional strain data to identify individual peaks thereof,
   wherein each peak is associated with a respective engine cylinder.

2. The method of claim 1, wherein the step of recording dynamic torsional strain data comprises generating a log of variance amplitude of torsional strain over time.

3. The method of claim 1, further comprising recording a substantially continuous indication of amplitude of torsional strain over time.

4. The method of claim 1, wherein the step of comparison comprises comparing an amplitude of the recorded torsional strain data to an amplitude of the idealised data.

5. The method of claim 1, wherein the comparison step comprises identifying a peak of the recorded torsional strain data.

6. The method of claim 1, further comprising synchronising the dynamic torsional strain data with an engine cycle.

7. The method of claim 1, wherein the comparison step comprises determining a frequency characteristic of at least part of the dynamic torsional strain data, and comparing the same with a frequency characteristic of the idealised operational data.

8. The method of claim 1, further comprising analysing the torsional strain data and identifying a characteristic of amplitude of the recorded torsional strain data in relation to time.

9. The method of claim 1, further comprising recording dynamic strain data over multiple engine cycles and calculating maximum, minimum and average values of torsional strain of the shaft.

10. The method of claim 1, further comprising analysing the dynamic torsional data, and determining one or more predominant frequencies present in the dynamic strain data.

11. The method of claim 1, further comprising measuring rotational speed of the shaft.

12. The method of claim 1, further comprising calculating a measure of power developed by the shaft.

13. The method of claim 1, wherein the recorded torsional strain data is compared to idealised torsional strain data.

14. The method of claim 1, wherein the method is suitable for monitoring engines operating between 400 rpm and 600 rpm.

15. The method of claim 1, wherein strain data is collected from the shaft at a rate of up to 4000hz.

16. The method of claim 1, further comprising identifying if after the comparison step a pre-determined operational threshold metric is reached or exceeded.

17. The method of claim 1, further comprising performing at least one of a Fast Fourier Transform, wavelet analysis or frequency analysis of the data.

18. An apparatus for monitoring operational performance of an engine, the apparatus comprising:
   a sensor for detecting torsional strain of a shaft of an engine,
   a data processor arranged to process signals received from the strain sensor, and further arranged to compare one or more operational characteristics of the detected torsional strain data with idealised operational data so as to provide a measure of operational performance indicator of the engine, and
   a torsional accelerometer,
   wherein the torsional accelerometer is arranged to be attached to the shaft to measure an angular vibration of the shaft.

19. The apparatus of claim 18, wherein the apparatus is arranged to provide a substantially continuous stream of dynamic torsional strain data to the data processor.

20. The apparatus of claim 18, wherein the data processor is arranged to determine data indicative of a variation of measured power developed by the shaft over time.

21. The apparatus of claim 18, wherein the data processor is arranged to perform the comparison so as to identify deviation between the idealised data and the detected torsional strain data.

22. The apparatus of claim 18, wherein the strain sensor comprises a full bridge strain gauge.

23. The apparatus of claim 22, wherein the sensor is arranged to be directly attached to the shaft.

24. An apparatus for monitoring operational performance of an engine, the apparatus comprising:
   a sensor for detecting torsional strain of a shaft of an engine, and
   a data processor arranged to process signals received from the strain sensor,
   wherein the data processor is arranged to compare one or more operational characteristics of the detected torsional strain data with idealised operational data so as to provide a measure of an operational performance indicator of the engine, and
   wherein the data processor is further arranged to analyse the detected torsional strain data to identify individual peaks thereof, wherein each peak is associated with a respective engine cylinder.

* * * * *